United States Patent [19]

Pinto

[11] Patent Number: 4,666,337
[45] Date of Patent: May 19, 1987

[54] METHOD AND DEVICE FOR INSULATION OF THE GROUND

[76] Inventor: Shlomo Pinto, 50 Balfour Street, Naharia, Israel

[21] Appl. No.: 668,964

[22] Filed: Nov. 7, 1984

[30] Foreign Application Priority Data

Nov. 8, 1983 [IL] Israel ................................ 70170

[51] Int. Cl.⁴ .................... E02B 13/00; E02F 5/10
[52] U.S. Cl. ................................ 405/176; 405/38; 405/179
[58] Field of Search .................. 405/38, 176, 179, 180, 405/270

[56] References Cited

U.S. PATENT DOCUMENTS

| | | |
|---|---|---|
| 1,803,838 | 5/1931 | Carpenter ................ 405/176 X |
| 2,158,952 | 5/1939 | Timberlake . |
| 3,405,528 | 10/1968 | Hansen et al. ................ 405/38 |
| 3,590,588 | 7/1971 | Draper . |
| 3,618,329 | 11/1971 | Hanson . |
| 3,874,182 | 4/1975 | Potter et al. ................ 405/179 |
| 4,073,152 | 2/1978 | Kishitani et al. . |
| 4,379,655 | 4/1983 | Brost et al. . |

FOREIGN PATENT DOCUMENTS

| | | |
|---|---|---|
| 1243111 | 6/1967 | Fed. Rep. of Germany ...... 405/179 |
| 2199333 | 3/1974 | France . |
| 2232211 | 12/1974 | France ................................ 405/180 |
| 51969 | 7/1982 | Israel . |
| 58712 | 7/1983 | Israel . |
| 869831 | 6/1961 | United Kingdom . |
| 711551 | 7/1974 | United Kingdom . |
| 718530 | 2/1980 | U.S.S.R. . |
| 819263 | 4/1981 | U.S.S.R. ................................ 405/176 |

Primary Examiner—David H. Corbin
Attorney, Agent, or Firm—Sandler & Greenblum

[57] ABSTRACT

There is provided a method for subterranean insulation of an area of the ground against water seepage therethrough. The method comprises the steps of forming a first trench of a predetermined depth from the surface of the ground and widening the trench by sequentially forming additional trenches along one side of the previously formed trench while simultaneously applying a water repellent layer substantially along the bottom surface of the previous formed trench and while at least partly covering the layer with earth removed from the additional trench being formed until the entire area of the ground is insulated. The invention also provided a device for carrying out this method.

19 Claims, 5 Drawing Figures

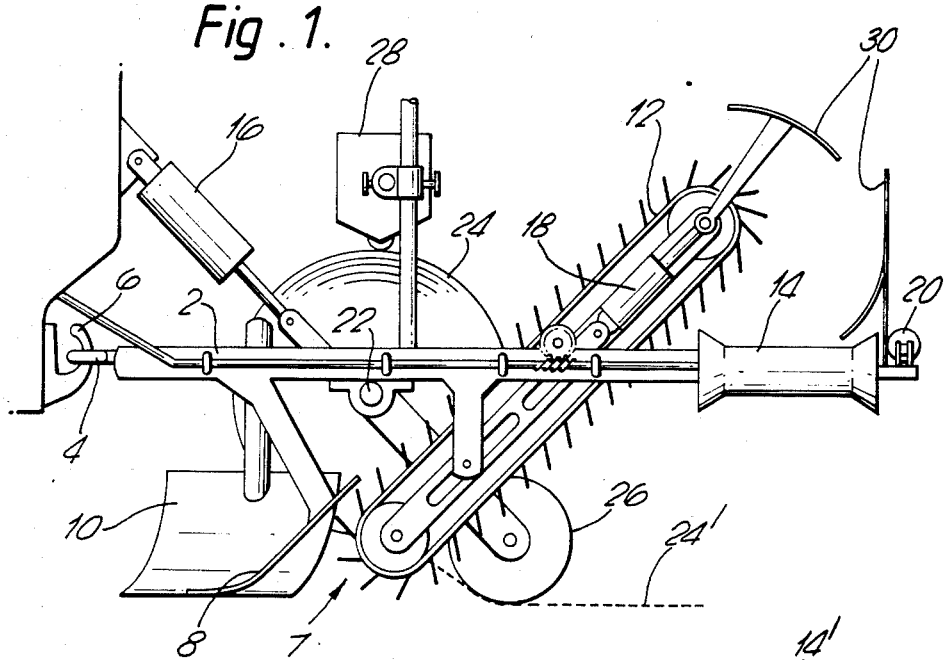
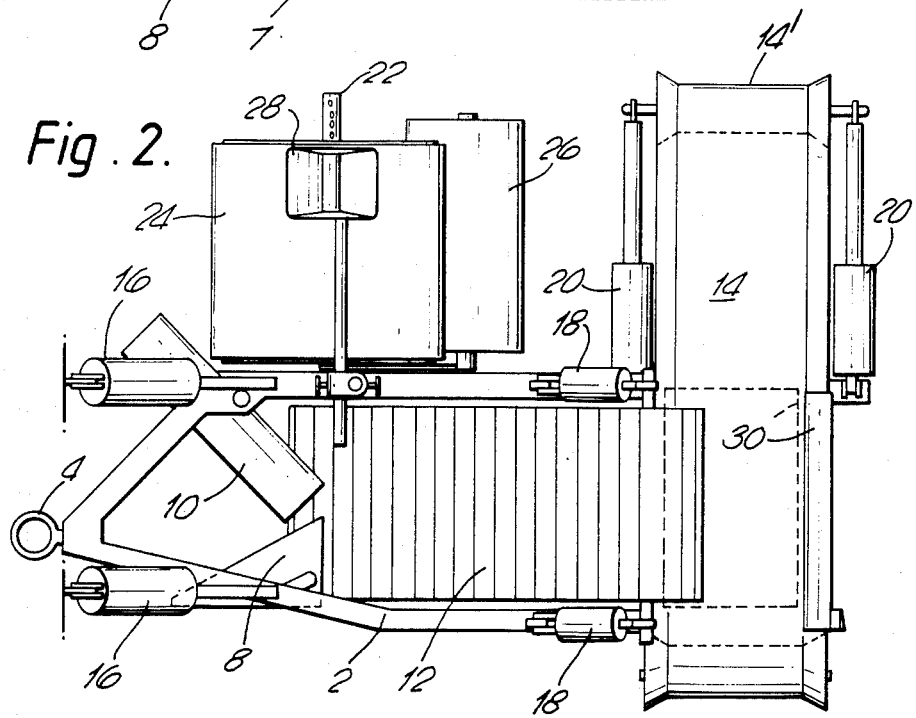

METHOD AND DEVICE FOR INSULATION OF THE GROUND

DESCRIPTION OF THE INVENTION

The present invention relates to a method and a device for subterranean insulation of an area of the ground against water seepage therethrough. More particularly the present invention is concerned with a method and a device for forming a subterranean layer of water repellent substance.

BACKGROUND OF THE INVENTION

A water repellent layer at a predetermined depth under the ground may be generally utilized in two ways: to prevent the escape of water into the ground from irrigated soil, from water reservoirs, fish raising ponds and the like as well as to prevent underground water from rising above a desired level under specific areas such as roads, airfield landing strips or even in residential areas.

There are known several methods of subterranean waterproofing. The most common one in use is carried out by spraying the area with material such as tar, cement or the like, or penetrating the soil with sprayers and effecting the desired waterproofing by means of a subterranean spraying. Another method is to spread a waterproof medium, such as plastic sheets onto the ground and cover it with soil. Alternatively the sheet may be spread subterraneously by means of a device which is described in Israel Patent No. 51969. The main disadvantage of the latter method resides in its incapability of spreading sheets in contact with each other such as to form an overlap and a watertight surface. Additionally, in order to perform the waterproofing at a reasonable depth, the device must be very powerful and even so sometimes the task cannot be achieved due to unexpected below ground obstacles such as rocks, plant roots and the like.

Israeli Patent No. 58 712 suggests a method and a device for laying strips of flexible sheet material under the ground which method does not require the ground soil to be first removed wherein the applicator is positioned below ground level. In addition to the aforementioned disadvantage of subterranean operation it is not believed that such a substantially "blind" attempt of waterproofing on area can be satisfactorily achieved.

SUMMARY OF THE INVENTION

It is therefore a broad object of the present invention to ameliorate the above disadvantages and to provide a method and a device for subterranean insulation of an area of a ground against water seepage therethrough.

It is a further object of the present invention to provide a method and a device for gradually forming a water repellent layer under the ground across one area thereof from single partly overlapping strips of water repellent material applied on an open surface at a predetermined depth, while simultaneously covering the thusly formed layer.

In accordance with these objects there is provided a method for subterranean insulation of an area of the ground against water seepage therethrough comprising the steps of:

a. forming a first trench of a predetermined depth from the surface of the ground;

b widening said trench by forming an additional trench along one side thereof while simultaneously applying a water repellent layer substantially along the bottom surface of said first trench and while at least partly covering said layer with earth removed from said additional trench; and c. repeating step b until the entire area of the ground is insulated.

The invention further provides a device for subterranean insulation of an area of the ground against water seepage therethrough comprising:

a chassis having a front end and a rear end;

earth digging means mounted adjacent the front end of said chassis and associated with means for removing the dug-out earth from the ground toward the rear end of said chassis to form a trench;

means mounted at the rear end of said chassis for conveying said dug out earth to a location adjacent a lateral side of said chassis; and an applicator for applying a water repellent layer substantially along the bottom surface of said trench.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 1 is a schematic side elevational view of the device, according to the invention;

FIG. 2 is a schematic top plan view of the device of FIG. 1;

DETAILED DESCRIPTION OF THE PREFERRED EMBODIMENT

Figure 3:
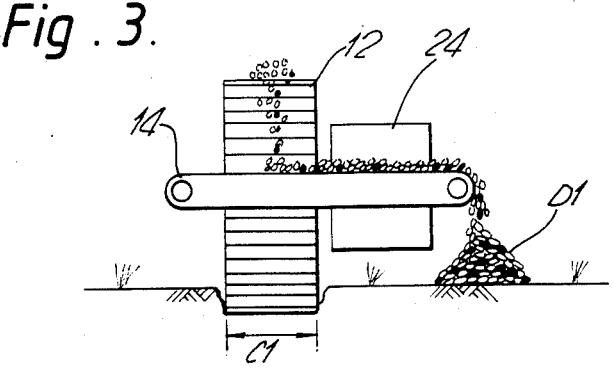
FIGS. 3, 4 and 5 are schematic views illustrating the steps for carrying out the method according to the invention.

The device according to the invention illustrated in FIGS. 1 and 2 is of the type which is not self propelled but is connectable to and pulled by a tractor which is not shown. The device comprises a chassis indicated as a whole by the numeral 2. The chassis has a front end fitted with an eyelet 4 for coupling with a hook 6 of a tractor and an opposite rear end. Adjacent the front end of the chassis there is mounted an earth digging means 7 which may be similar to a conventional plough share 8 and is specifically chosen in accordance with particular soil conditions.

Near the plough share 8, there is also connected to the chassis 2 a scraping member 10, the function of which is to flatten and smooth the dug in ground, that is, the trench being dug. There is further carried by the chassis 2 a trench excavator 12, e.g., a bucket excavator. As can be understood, the task of the plough share is to break up the soil in front of the trench excavator 12 and so to prevent undue pressure on that end of the excavator which is nearest to the soil. Both the share 8 and scraper 10 push the ploughed soil lumps towards the excavator 12. In light soils, such as sandy areas, the use of share and scraper may not be necessary. The excavator 12 carries the dug out soil upwardly and rearwardly to deposit the same on a band conveyor 14 which extends and runs substantially in a direction normal to the direction of travel of the device.

In order to permit the raising, lowering and levelling of the chassis 2, the latter is coupled to a pulling tractor (not shown) by means of a set of hydraulic cylinders 16. A second set of hydraulic cylinders 18 can lower or raise the excavator 12 and so adjust its inclination. A third set of hydraulic cylinders 20 are responsible for adjusting the output end 14' of conveyor 14 with respect to the major axis of the excavator 12 so that the exact location of dug out soil deposition can be controlled.

The device is further equipped with a sheet strip support 22 carrying a roll 24 of plastic sheet strip 24' and a roller 26 for spreading and laying the sheet strips on the dug out trench bottom surface. Adjacent to the roll 24 there is disposed a dispenser 28 adapted to apply glue or sealants onto the unwound sheet strip so that upon laying overlapped layers at the trench bottom surface a positive seal will be obtained.

Both conveyors 12 and 14 are powered by a tractor via the schematically shown drive shaft 30 and the required hydraulic power can also be supplied by tractor as known per-se.

The device may further be provided with an attachment for cleaning the sheet strip already spread on the trench bottom surface prior to the laying of an additional layer partly on it. Such an attachment may comprise a rotating brush, a vacuum suction cleaner or the like. The device may also be equipped with means for pressing the bottom surface of the open trench prior to spreading the sheet strips or the spraying of the insulating layer.

Figure 4:
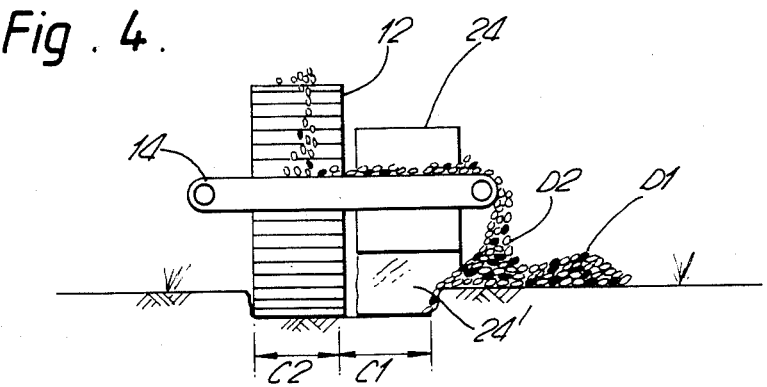
Figure 5:
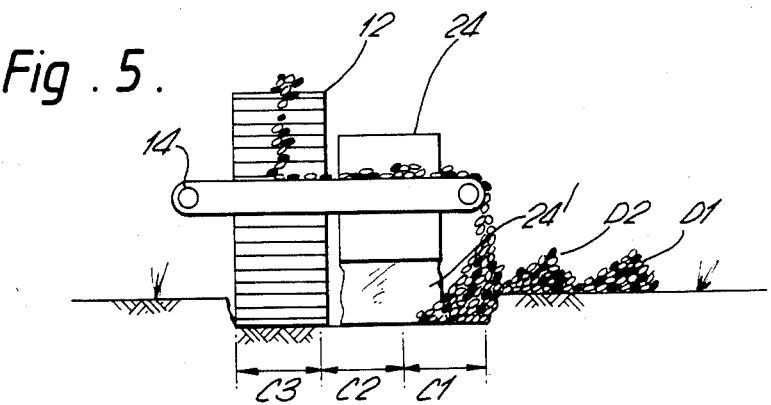

The manner in which the above described device operates will now be explained with reference to FIGS. 3-5. The device which is shown in a rear view travels along the edge of an area to be insulated. The share 8 and the excavator 12 produce a trench indicated by $C_1$ and the soil deposited on conveyor 14 is dumped along the path of the device at $D_1$. At the end of its path, i.e. at an edge of the area the device turns around and widens said trench on one side thereof indicated by $C_2$. At the commencement of the said return run the beginning of a sheet strip 24' from roll 24 is placed in the open trench $C_1$ and is fixed there, e.g. by placing some stones on it. Now, during travel the sheet is unwound and laid on the bottom surface of trench $C_1$, at the same time it is partially covered by soil $D_2$ dug from $C_2$ and dispensed from conveyor 14 on it. In this manner, the device travels from one edge of the area to its opposite edge, digging "trenches" one after the other and depositing the dug up soil in the trench dug immediately before the one being dug, laying impermeable sheet material in the previously dug trench and covering it up with soil from the trench now being produced. In a preferred manner the sheet strip is only partly covered by the soil from the trench being produced while spreading the adjacent strip in a partly overlapping fashion on the strip spread before. When employing this preferred manner of sheet strip laying, glue or sealant can be introduced by means of dispenser 28, between the overlapping sheet portions.

The same method for subterranean insulation of an area of the ground can just as well be employed with the use of a sprayer spraying insulating or water repellent material such as tar, cement mix, or any other suitable synthetic sprayable substance. Hence, instead of the plastic sheet strip applicator, there will be mounted a reservoir containing the sprayable material and one or more nozzles suitably aimed for covering a surface with a strip of a sprayed on material.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for subterranean insulation of an area of the ground against water seepage therethrough using a chassis adapted to be moved by a vehicle, said chassis comprising earth digging means and an applicator mounted on a lateral side of said chassis for applying a water-repellant layer, said method comprising the steps of:
   (a) forming a first trench of a predetermined depth from the surface of the ground and of a predetermined width;
   (b) widening said first trench by forming an additional trench along one side adjacent to said first trench while simultaneously applying a water repellant layer substantially along the bottom surface of said first trench adjacent to a lateral side of said chassis using said applicator and while partly covering said layer deposited along said first trench bottom with earth removed from said additional trench using means mounted at the rear end of said chassis for conveying dug-out earth to a location adjacent to said lateral side of said chassis so that the width of an open trench uncovered by earth is greater than the width of the repellent layer; and
   (c) repeating step b by partly overlapping an elongated portion of an adjacently applied layer with a portion of the newly applied layer forming contacting overlapping layers until the entire area of the ground is insulated.

2. The method as claimed in claim 1 wherein said water repellent layer is a layer of plastic sheet material which is applied on said bottom surface by rolling said layer of plastic sheet material off a supply roll.

3. The method as claimed in claim 1 wherein said layer is formed over the entire area by partly overlapping edges of elongated strips of plastic sheet material.

4. The method as claimed in claim 1 wherein said water repellent layer is formed by spraying water repellent material along the bottom surface of said trench.

5. The method as claimed in claim 3 further comprising the step of applying glue along one edge of said strips, so that when said one edge contacts a previously layed strip, said sheets adhere to each other along the overlapping area.

6. The method as claimed in claim 1 further comprising the step of smoothing the bottom surface of the trench prior to applying said layer.

7. The method as claimed in claim 2 further comprising the step of pressing said plastic sheet material against the bottom of the trench after applying said plastic sheet material on the ground.

8. A device for subterranean insulation of an area of the ground against water seepage therethrough comprising:

(a) a chassis having a front end and a rear end;

(b) earth digging means mounted adjacent the front end of said chassis and associated with means for removing the dug-out earth from the ground toward the rear end of said chassis to form a trench;

(c) means mounted at the rear end of the chassis for mechanically conveying said dug-out earth to a location adjacent an outer lateral outer side of said chassis;

(d) an applicator mounted on said chassis and arranged to apply a water repellant layer substantially along the bottom surface of a trench, adjacent to said outer lateral side of said chassis; and (e) said means mounted at the rear end of the chassis being constructed and arranged to convey earth beyond the inner lateral edge of said layer whereby said last mentioned edge remains free of earth.

9. The device as claimed in claim 8 further comprising coupling means for operational interengagement with a tractor.

10. The device as claimed in claim 8 wherein said earth digging means includes a plough share and a scraper.

11. The device as claimed in claim 8 wherein said means for removing the dug-out earth extends diagonally from below the front end of said chassis to above the rear end of said chassis.

12. The device as claimed in claim 8 wherein said means for conveying said dug-out earth is an endless belt conveyor mounted across said chassis.

13. The device as claimed in claim 12 wherein the lateral extension of the output end of said conveyor with respect to the major axis of the excavator, is adjustable.

14. The device as claimed in claim 8 wherein said applicator is a plastic sheet strip applicator including a support for a supply roll and a roller for spreading said strip along the bottom of the trench.

15. The device as claimed in claim 14 further comprising a glue applicator for applying glue along one edge of said strip.

16. The device as claimed in claim 8 wherein:

(a) said means for removing the dug-out earth comprises an excavator positioned substantially parallel to the direction of travel of said chassis, running substantially diagonally between said ground and said means mounted at the rear end of the chassis; and (b) said means mounted at the rear end of the chassis comprises an endless belt conveyor positioned perpendicular to the direction of travel of said chassis for depositing the dug-out earth in a previously dug trench.

17. A device for subterranean insulation of an area of ground against water seepage, said device being adapted to be moved by a vehicle travelling in a given direction comprising:

(a) a chassis having a front end and a rear end;

(b) earth digging means mounted adjacent to said front end of said chassis for digging a trench when said vehicle travels in said given direction and temporarily removing earth from said area;

(c) first conveyor means for receiving removed earth from said earth digging means, and raising said removed earth in a direction substantially parallel to said direction of travel;

(d) second conveyor means, separate from said first conveyor means, for receiving said removed earth from said first conveyor means, and moving said removed earth in a direction substantially perpendicular to said given direction of travel; and (e) means for applying a water repellant layer substantially along a bottom surface adjacent to an outer lateral outer side of said chassis, said means for applying a water repellant layer being mounted at least partly alongside of said chassis; and wherein said second conveyor deposits said removed earth on said applied water repellant layer so as to only partly cover the same.

18. The device according to claim 17 wherein said first conveyor means comprises an excavator which runs substantially along a diagonal between said ground and said second conveyor means.

19. The device according to claim 18 wherein said second conveyor means comprises an endless belt conveyor.

* * * * *